(12) United States Patent
Morimoto et al.

(10) Patent No.: US 11,598,669 B2
(45) Date of Patent: Mar. 7, 2023

(54) OPTICAL SPECTRUM ANALYZER

(71) Applicant: ANRITSU CORPORATION, Kanagawa (JP)

(72) Inventors: Shinji Morimoto, Kanagawa (JP); Motohiro Banno, Kanagawa (JP); Taichi Murakami, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/654,683

(22) Filed: Mar. 14, 2022

(65) Prior Publication Data

US 2022/0307901 A1 Sep. 29, 2022

(30) Foreign Application Priority Data

Mar. 24, 2021 (JP) .............................. JP2021-049882

(51) Int. Cl.
*G01J 3/02* (2006.01)
*G01J 3/18* (2006.01)
*G02B 27/28* (2006.01)

(52) U.S. Cl.
CPC ................ *G01J 3/18* (2013.01); *G01J 3/021* (2013.01); *G01J 3/0208* (2013.01); *G01J 3/0216* (2013.01); *G02B 27/283* (2013.01)

(58) Field of Classification Search
CPC ........ G01J 3/18; G01J 3/14; G01J 3/28; G01J 3/0208; G01J 3/021; G01J 3/0216; G01J 3/0218; G01J 3/0224; G01J 3/0256; G02B 27/283
See application file for complete search history.

(56) References Cited

U.S. PATENT DOCUMENTS

| 4,758,086 A | 7/1988 | Sonobe et al. | |
| 6,636,306 B2 | 10/2003 | He et al. | |
| 2006/0103841 A1* | 5/2006 | Ohishi | .................. G01J 3/0224 356/328 |

FOREIGN PATENT DOCUMENTS

JP S62-28623 A 2/1987

* cited by examiner

*Primary Examiner* — Abdullahi Nur
(74) *Attorney, Agent, or Firm* — Pearne & Gordon LLP

(57) ABSTRACT

An optical spectrum analyzer is provided that can separate measurement target light into orthogonal polarization components and perform measurement and enable optical spectrum measurement that does not depend on polarization of the measurement target light. Measurement target light is separated into two orthogonal polarization components, the two polarization components whose position is shifted in an engraved line direction of a diffraction grating are incident on the diffraction grating, diffracted light of the two polarization components emitted from the diffraction grating is condensed, and the condensed diffracted light is incident on an incident side end surface of a 2-core ferrule with the two polarization components adjacent to each other.

6 Claims, 5 Drawing Sheets

OPTICAL SPECTRUM ANALYZER

TECHNICAL FIELD

The present disclosure relates to an optical spectrum analyzer.

BACKGROUND ART

In general, an optical spectrum analyzer can separate the measurement target light for each wavelength using a spectroscope, display the power distribution for each wavelength as a spectrum on the screen, or display the optical power measurement value for each wavelength.

For example, the optical measuring instrument of Patent Document 1, separates the light dispersed by the spectroscopic element into two or more polarization light having different polarization components by the polarization element, receives the polarization light by the light receiving element to output an electric signal, and calculates the absolute value of the optical power for each dispersed wavelength.

Further, the optical spectrum analyzer of Patent Document 2 separates the measurement target light (input light beam) into linear polarization light orthogonal to each other by a polarization separating means PDM, inputs the separated light LR and LT of each polarization component from the input means I1 and I2 to the diffraction grating DG via the polarization preservation fibers PMF1 and PMF2, and guides the diffracted light of each polarization component from each of the output means O1 and O2 to the receiver via the fiber.

RELATED ART DOCUMENT

Patent Document

[Patent Document 1] JP-A-62-28623
[Patent Document 2] U.S. Pat. No. 6,636,306

DISCLOSURE OF THE INVENTION

Problem that the Invention is to Solve

In an optical measuring instrument as in Patent Document 1, the measurement target light after spectroscopy is separated into a P polarization component and an S polarization component, photoelectric conversion is separately performed, and absolute powers can be calculated and obtained from the electric signal based on the diffraction efficiency, loss rate, and photoelectric conversion efficiency for each of the P polarization component and the S polarization component. As a result, absolute power measurement without depending on polarization can be performed although the diffraction efficiency of the P polarization and the S polarization are different.

However, the optical measuring instrument of Patent Document 1 requires a slit mechanism that allows only the light dispersed by the spectroscope to pass through, and further, it is required to prepare a polarization separation optical system using a polarization element on the outside of the spectroscope, so that the optical system becomes large and expensive. Further, although the method of Patent Document 2 is adopted, a polarization separating means is required outside the spectroscope, which leads to an increase in the size and price of the optical system.

The present disclosure has been made in view of the above-mentioned circumstances, and an object of the present disclosure is to provide an optical spectrum analyzer that can separate the measurement target light into orthogonal polarization components and measure optical spectrum, and that is compact, inexpensive, highly reliable, and having high wavelength resolution with being able to measure optical spectrum without depending on the polarization of the measurement target light.

Means for Solving the Problem

In order to achieve the above-mentioned object, the optical spectrum analyzer according to the present disclosure is characterized by the following (1) to (6).

(1) An optical spectrum analyzer having a light incident portion that is inputted measurement target light, a collimator that converts the measurement target light incident on the light incident portion into parallel light, a diffraction grating that diffracts the parallel light, and a condenser that condenses diffracted light from the diffraction grating, includes a polarization separation portion that separates the parallel light emitted from the collimator into light of two polarization components and outputs the light to the diffraction grating, a fixed slit that is disposed at a position at which diffracted light of each polarization component is condensed by the condenser, a 2-core ferrule that separately takes in the diffracted light of each polarization component that has passed through the fixed slit, two light receiving portions that each photoelectrically convert the diffracted light of each polarization component taken into the 2-core ferrule, and a signal processing portion that processes an electric signal output by each of the two light receiving portions to obtain an optical spectrum, in which each polarization plane of the two polarization components separated by the polarization separation portion is incident on the diffraction grating in a state of being shifted by 45 degrees in opposite directions from each other with respect to an engraved line of the diffraction grating, and the fixed slit is fixed to an end portion of the 2-core ferrule in a state where the diffracted light of each of the two polarization components can pass therethrough.

(2) In the optical spectrum analyzer according to the above (1), the condenser condenses the diffracted light of the two polarization components that have passed through the diffraction grating once and guides the diffracted light to the fixed slit.

(3) The optical spectrum analyzer according to the above (1) further includes a return mirror that is disposed at a position at which the diffracted light from the diffraction grating can be incident and returns incident light in an engraved line direction of the diffraction grating to input the incident light to the diffraction grating again, in which the condenser condenses the diffracted light of the two polarization components that have passed through the diffraction grating twice and guides the diffracted light to the fixed slit.

(4) In the optical spectrum analyzer according to the above (1), the fixed slit is constituted with a thin plate-shaped small piece member in which the slit is formed by aligning a longitudinal direction of the slit with an engraved line direction of the diffraction grating, and is attached and fixed to an end surface of the 2-core ferrule.

(5) In the optical spectrum analyzer according to the above (1), a direction of an end surface of the 2-core ferrule and a surface of the fixed slit is inclined with respect to an incident axis direction of incident light.

(6) In the optical spectrum analyzer according to the above (1), a slit shape of the fixed slit is disposed in a state in which a longitudinal direction thereof coincides with an alignment direction of two cores of the 2-core ferrule, a longitudinal direction dimension of the slit shape is two times or more a diameter of the core, and a width direction dimension of the slit shape is smaller than the diameter of the core.

According to the optical spectrum analyzer of the configuration of the above (1), the fixed slit fixed to the end portion of the 2-core ferrule can extract the light required for measurement, that is, only the diffracted light of each of the two polarization components separated in the engraved line direction of the diffraction grating. Accordingly, it is not necessary to equip the spectroscope with a slit mechanism in related art for extracting only the dispersed light component of a specific wavelength, and it becomes easy to reduce the size and cost of the optical system. Further, by providing the fixed slit, it is possible to improve the wavelength resolution while suppressing the decrease in the light intensity received by the light receiving portion. Further, since the fixed slit is fixed to the end portion of the 2-core ferrule, it is easy to align the opening area in the fixed slit and the center of each core in the 2-core ferrule. Further, since each polarization plane of the two polarization components of the light incident on the polarization separation portion is shifted by 45 degrees in opposite directions from each other with respect to the engraved line of the diffraction grating, and the separation direction of the two polarization components separated by the polarization separation portion is the same as the engraved line direction of the diffraction grating, the diffraction efficiency in the diffraction grating is the same for the two polarization components. Accordingly, the diffracted light of the two polarization components can be detected without polarization dependence.

According to the optical spectrum analyzer of the configuration of the above (2), since the return mirror that enters the diffracted light on the diffraction grating again is not used, the configuration of the optical system can be simplified, and it becomes easy to reduce the size and cost.

According to the optical spectrum analyzer of the configuration of the above (3), since a double-pass spectroscope that enters the diffracted light on the diffraction grating again is used, the angle of incidence on the diffraction grating can be increased, and further, since the diffraction grating performs diffraction twice (additional dispersion), the resolution is improved and miniaturization also becomes easy.

According to the optical spectrum analyzer of the configuration of the above (4), by attaching the fixed slit constituted with a thin plate-shaped small piece member to the end surface of the 2-core ferrule, the positional relationship therebetween can be fixed, and thus it is easy to align and attach the opening area of the fixed slit and the center of each core in the 2-core ferrule. Further, since the longitudinal direction of the fixed slit is aligned with the engraved line direction of the diffraction grating, the diffracted light of the two polarization components can be passed through the fixed slit at the same time and guided to each core in the 2-core ferrule.

According to the optical spectrum analyzer of the configuration of the above (5), since the direction of the end surface of the 2-core ferrule and the surface of the fixed slit is inclined with respect to the incident axis direction, it is possible to prevent the reflected light generated on the surface from returning to the side of the spectroscope, and it is possible to suppress the generation of unnecessary stray light in the spectroscope.

According to the optical spectrum analyzer of the configuration of the above (6), since the longitudinal direction of the slit shape coincides with the alignment direction of two cores of the 2-core ferrule, and further, the longitudinal direction dimension is two times or more the diameter of the core, the diffracted light of the two polarization components incident on the fixed slit can be guided to the end surface of the two cores of the 2-core ferrule. Further, since the width direction dimension of the slit shape is smaller than the core diameter and the wavelength resolution is determined by the slit width, the spatial resolution can be increased although the core diameter is not reduced. In addition, since it is not necessary to reduce the core diameter, the light intensity that can be received can be increased, the alignment between the slit and the core also becomes easy, and it is also less susceptible to the effect of spatial displacement of light beams due to thermal expansion and contraction of components.

Advantage of the Invention

According to the optical spectrum analyzer of the present disclosure, since the fixed slit is directly attached to the 2-core ferrule, the slit mechanism in related art is unnecessary, and miniaturization, cost reduction, high reliability, and high wavelength resolution are realized. Further, the assembly of the optical system also becomes easy.

The present disclosure has been briefly described above. Further, the details of the present disclosure will be further clarified by reading through a mode for carrying out the invention described below (hereinafter referred to as an "embodiment") with reference to the accompanying drawings.

BEST MODE FOR CARRYING OUT THE INVENTION

Specific embodiments of the present disclosure will be described below with reference to the respective figures.

Configuration of Optical Spectrum Analyzer

Figure 1A:
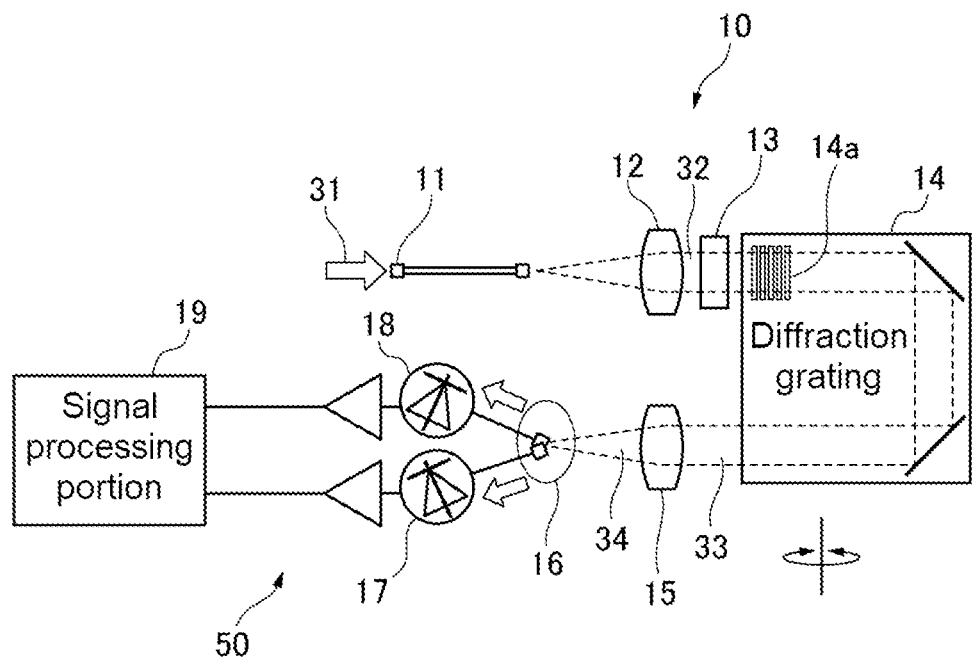
FIG. 1A is a block diagram showing a configuration of a main portion of an optical spectrum analyzer according to an embodiment of the present disclosure.
Figure 1B:
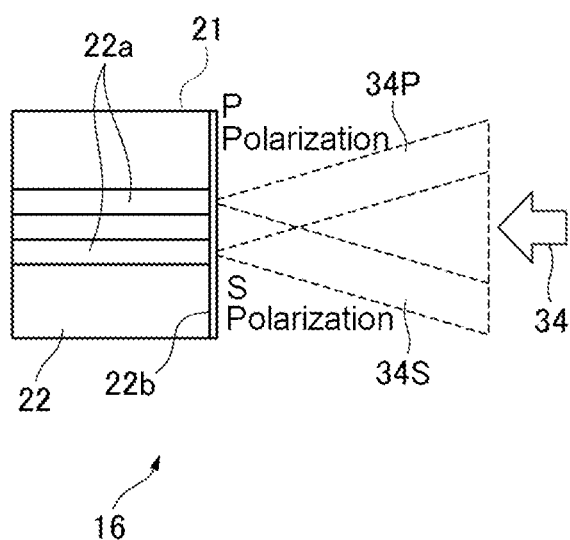
FIG. 1B is an enlarged diagram showing a detail of a configuration of a portion of the optical spectrum analyzer shown in FIG. 1A.

The configuration of the main portion of an optical spectrum analyzer 50 according to the embodiment of the present disclosure is shown in FIG. 1A, and the details of a portion of a plurality of polarization introduction portions 16 shown in FIG. 1A are shown in FIG. 1B.

As shown in FIG. 1A, the optical spectrum analyzer includes a distribution type spectroscope 10 constituting the main portion of the optical system, light receiving portions 17 and 18 that receives the diffracted light dispersed by the distribution type spectroscope 10 and converts the light into an electric signal, and a signal processing portion 19 that processes the electric signal.

Further, the distribution type spectroscope 10 includes a light incident portion 11, a collimator 12, a polarization separation portion 13, a diffraction grating 14, and a condenser 15.

The measurement target light 31 incident on the light incident portion 11 is converted into parallel light by the collimator 12 and input to the polarization separation portion 13. The parallel light 32 input to the polarization separation portion 13 includes two polarization components (P polarization, S polarization, or the like) that are orthogonal to each other in a state where the polarization planes are shifted by 45 degrees in opposite directions from each other with respect to an engraved line 14a of the diffraction grating 14.

The light of each polarization component of the parallel light 32 input to the polarization separation portion 13 is separated from each other in a state of the positions being shifted from each other in the direction of the engraved line 14a of the diffraction grating 14 inside the polarization separation portion 13, and emitted from the polarization separation portion 13.

The light of each polarization component separated by the polarization separation portion 13 is inputted to the diffraction grating 14, and the light of each polarization component becomes diffracted light diffracted by the diffraction grating 14 with different diffraction efficiencies for each wavelength, that is, in a dispersed state for each wavelength, and is emitted from the diffraction grating 14. However, since the light separated by the polarization separation portion 13 is two polarization components orthogonal to each other in which each of the polarization planes is shifted by 45 degrees in opposite directions from each other with respect to the engraved line 14a of the diffraction grating 14, the diffracted light of the light of each polarization component is diffracted by the diffraction grating 14 with the same diffraction efficiency. That is, the diffracted light of the light of each polarization component having the same wavelength is directed in the same direction with the positions slightly shifted. The diffracted light of each polarization component emitted from the diffraction grating 14 is inputted to the condenser 15 and condensed, and reaches the plurality of polarization introduction portions 16.

As shown in FIG. 1B, there is a fixed slit constituted with a slit tip 21 at a position of the plurality of polarization introduction portions 16. Further, the slit tip 21 is attached and fixed to an incident side end surface 22b of the 2-core ferrule 22. Inside the 2-core ferrule 22, two cores 22a are disposed in a parallel state as an optical fiber of a core wire. The slit of the slit tip 21 is attached to be aligned with the core 22a in advance.

As shown in FIG. 1B, the diffracted light 33 of each polarization component input to the condenser 15 is condensed as the diffracted light 34 at the position of the slit tip 21 forming the fixed slit, and passes through the fixed slit, and then each light of a P polarization component 34P and an S polarization component 34S is taken into each core 22a of the 2-core ferrule 22 in a state of being separated from each other.

That is, since the polarization separation portion 13 separates the light of each polarization component in the direction of the engraved line 14a of the diffraction grating 14, the diffracted light of the light of each polarization component passes through one cut fixed slit at the same time in a state where the direction of the engraved line 14a of the diffraction grating 14 coincides with the longitudinal direction of the slit, and is incident on each core 22a of the 2-core ferrule 22.

Each light of the P polarization component 34P and the S polarization component 34S taken into each core 22a of the 2-core ferrule 22 is received by the two light receiving portions 17 and 18 shown in FIG. 1A, respectively, and is photoelectrically converted to become an electric signal representing each light intensity, which is signal-processed by the signal processing portion 19.

The diffraction grating 14 has a movable portion, and the position of the diffraction grating 14 can be changed by driving the movable portion with an electric motor. When the position of the diffraction grating 14 changes, the direction in which the diffracted light is directed for each dispersed wavelength changes, so that the wavelength of the light incident on the fixed slit changes. Accordingly, the signal processing portion 19 can acquire the spectrum of the measurement target light by measuring the reception intensity distribution of the light when sweeping the wavelength of the diffracted light received by the light receiving portions 17 and 18 by driving the electric motor.

Configuration of Slit Tip 21

Figure 2A:
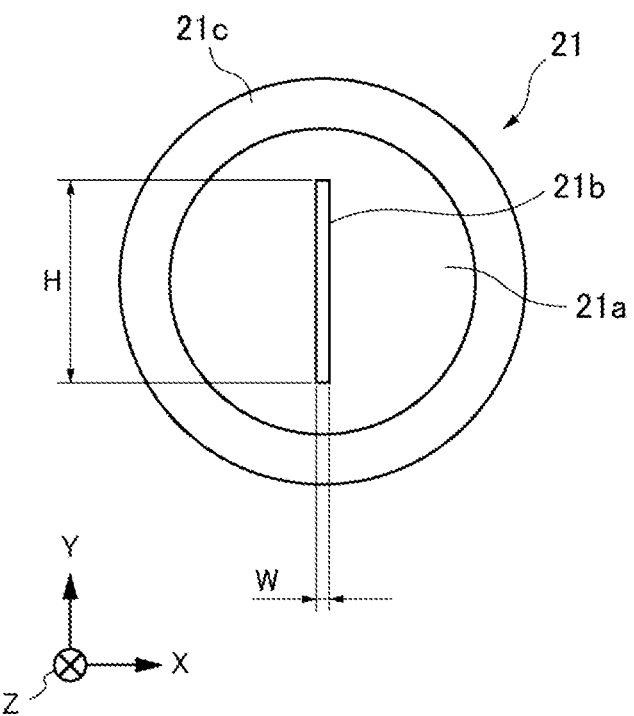
FIG. 2A is a front view showing a slit tip.
Figure 2B:
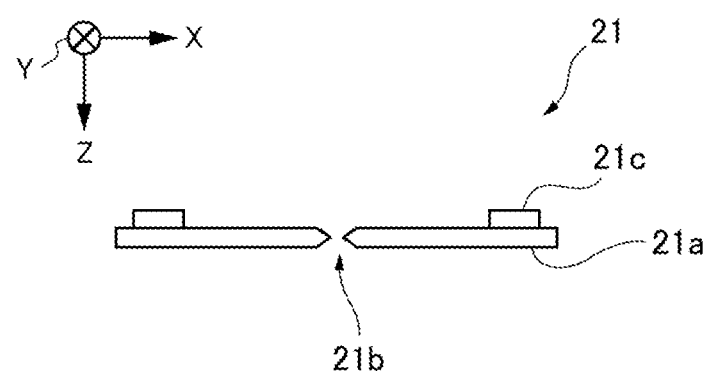
FIG. 2B is a vertical cross-sectional view showing the same slit tip.

Details of the slit tip 21 are shown in FIGS. 2A and 2B. FIG. 2A is a front view, and FIG. 2B is a vertical cross-sectional view showing a cross-sectional structure near the center of FIG. 2A.

The slit tip 21 shown in FIGS. 2A and 2B is formed by superimposing a base material 21a formed as a thin rectangular small piece and a second layer material 21c of a ring shape, and a slit-shaped opening 21b is formed on the base material 21a. The slit-shaped opening 21b is formed inside the ring of the second layer material 21c. The slit-shaped opening 21b is a fixed slit. In the slit-shaped opening 21b shown in FIGS. 2A and 2B, the longitudinal direction dimension is represented by H and the width dimension is represented by W.

In the present embodiment, the width dimension W of the slit-shaped opening 21b is set to 10 μm, and the longitudinal direction dimension H is set to 200 μm. As a precondition to set the dimensions, it is assumed that the GI fiber constituting the main body of the 2-core ferrule 22 has a core diameter of 62.5 μm and a clad diameter of 125 μm. That is, the length H of the slit needs to be two times or more, preferably about three times or more the core diameter. This is to allow the light of the two polarization components to pass through the same fixed slit at the same time. Further, by making the slit width W smaller than the core diameter of the 2-core ferrule 22, the wavelength resolution in the optical spectrum analyzer 50 can be determined by the slit width W.

Since the slit tip 21 is constituted with thin small pieces, the slit tip 21 can be directly attached and fixed to the end surface of the 2-core ferrule 22. Specifically, by using an adhesive such as an ultraviolet curable resin, the surface of the slit tip 21 can be fixed to the incident side end surface 22b of the 2-core ferrule 22 as shown in FIG. 1B.

When fixing the slit tip 21 to the 2-core ferrule 22, it is necessary to perform alignment of the slit and the core. That is, the orientation is adjusted so that the longitudinal direction in the slit-shaped opening 21b of the slit tip 21 and the alignment direction of the two cores 22a coincide with each other, and the positions are appropriately aligned. As a result, as shown in FIG. 1B, the light of the P polarization component 34P and the S polarization component 34S incident on the slit of the same slit tip 21 can pass through the slit at the same time and be incident on each of the two cores 22*a*.

Configuration of Light Guide Portion 25

Figure 3:
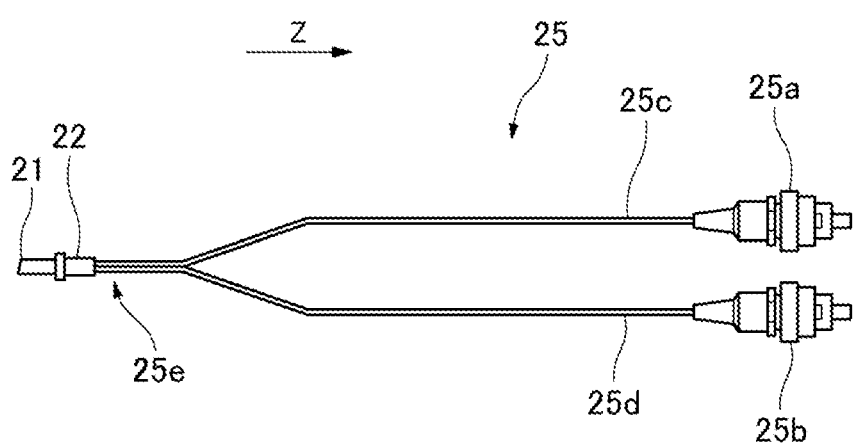
FIG. 3 is a front view showing the configuration of a light guide portion.

FIG. 3 shows the configuration of the light guide portion 25 in the optical spectrum analyzer 50 shown in FIG. 1A.

The light guide portion 25 shown in FIG. 3 has the 2-core ferrule 22 to which the slit tip 21 is fixed, optical connectors 25*a* and 25*b*, and optical fibers 25*c* and 25*d*. The optical connectors 25*a* and 25*b* are connected to the two light receiving portions 17 and 18, respectively.

The diffracted light of the P polarization component 34P incident on the 2-core ferrule 22 from the condenser via the slit tip 21 is directed to the optical connector 25*a* through the optical fiber 25*c*, and the diffracted light of the S polarization component 34S is directed to the optical connector 25*b* through the optical fiber 25*d*.

Configuration of 2-Core Ferrule 22

Figure 4A:
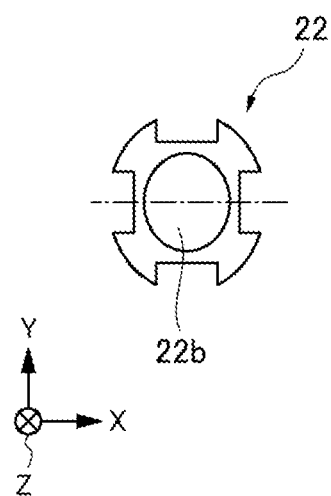
FIG. 4A is a front view showing a 2-core ferrule.
Figure 4B:
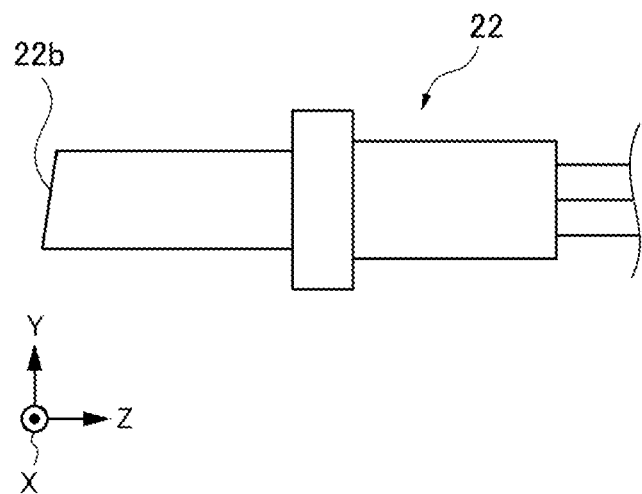
FIG. 4B is a right side view showing the same 2-core ferrule.

A configuration example of the 2-core ferrule 22 is shown in FIGS. 4A and 4B. FIG. 4A is a front view, and FIG. 4B is a right side view.

The 2-core ferrule 22 shown in FIGS. 4A and 4B is formed of zirconia. Further, the incident side end surface 22*b* of the 2-core ferrule 22 is disposed in a slightly inclined state with respect to a surface perpendicular to an axis of the longitudinal direction of the 2-core ferrule 22. The slit tip 21 is attached and fixed to the surface of the incident side end surface 22*b* as shown in FIG. 1B.

Accordingly, the direction of the light incident on the slit tip 21 and the 2-core ferrule 22 from the condenser 15 is in a state of being slightly inclined with respect to the surface of the slit tip 21 and the incident side end surface 22*b* of the 2-core ferrule 22.

Accordingly, the reflected light generated by the light incident on the surface of the slit tip 21 and the incident side end surface 22*b* of the 2-core ferrule 22 is directed in an axial direction different from the direction of the incident light. Accordingly, it is possible to prevent the reflected light generated on the surface of the slit tip 21 and the incident side end surface 22*b* of the 2-core ferrule 22 from returning to the side of the spectroscope, and it is possible to suppress the generation of unnecessary stray light.

Modification Example

Figure 5:
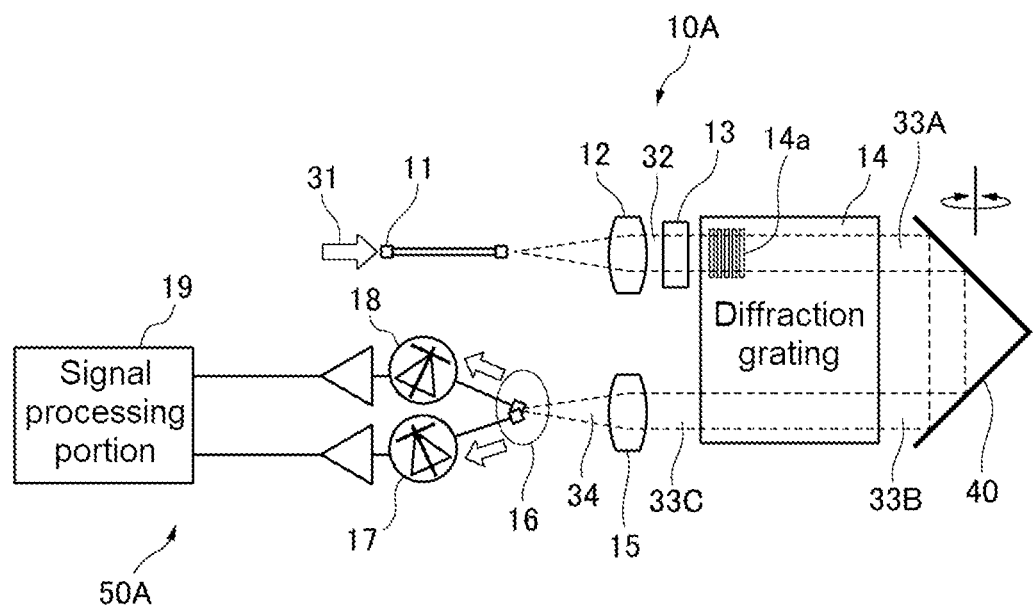
FIG. 5 is a block diagram showing a configuration of an optical spectrum analyzer of a modification example.

The configuration of an optical spectrum analyzer 50A of the modification example is shown in FIG. 5.

In the optical spectrum analyzer 50A of FIG. 5, the distribution type spectroscope 10A is constituted with a double-pass spectroscope provided with a return mirror 40, and the optical path of the distribution type spectroscope 10A is different from the distribution type spectroscope 10 of FIG. 1A. The distribution type spectroscope 10 and 10A are almost the same for other components.

The operation of the optical spectrum analyzer 50A of FIG. 5 will be described below.

The measurement target light 31 incident on the light incident portion 11 is converted into the parallel light 32 by the collimator 12 and input to the polarization separation portion 13. The parallel light 32 input to the polarization separation portion 13 includes two polarization components (P polarization, S polarization, or the like) that are orthogonal to each other in a state where the polarization planes are shifted by 45 degrees in opposite directions from each other with respect to an engraved line 14*a* of the diffraction grating 14.

The light of each polarization component of the parallel light 32 input to the polarization separation portion 13 is separated from each other in a state of the positions being shifted from each other in the direction of the engraved line 14*a* of the diffraction grating 14 inside the polarization separation portion 13, and emitted from the polarization separation portion 13.

The light of each polarization component separated by the polarization separation portion 13 is inputted to the diffraction grating 14, and the light of each polarization component becomes diffracted light 33A diffracted by the diffraction grating 14 with different diffraction efficiencies for each wavelength to be emitted from the diffraction grating 14 and is directed to the return mirror 40. The diffracted light 33A is returned in the direction of the engraved line 14*a* of the diffraction grating 14 by the return mirror 40, and is directed to the diffraction grating 14 again as diffracted light 33B.

The diffracted light 33B is inputted to the diffraction grating 14 and diffracted again, and is emitted from the diffraction grating 14 as the diffracted light 33C. The diffracted light 33C of each polarization component emitted from the diffraction grating 14 is inputted to the condenser 15 and condensed, and reaches the plurality of polarization introduction portions 16.

Similar to the case of the optical spectrum analyzer 50, there is a fixed slit constituted with the slit tip 21 as shown in FIG. 1B at a position of the plurality of polarization introduction portions 16. Further, the slit tip 21 is attached and fixed to an incident side end surface 22*b* of the 2-core ferrule 22. Inside the 2-core ferrule 22, two cores 22*a* are disposed in a parallel state as an optical fiber of a core wire. The slit of the slit tip 21 is attached to be aligned with the core 22*a* in advance.

As shown in FIG. 1B, the diffracted light 33C of each polarization component input to the condenser 15 is condensed as the diffracted light 34 at the position of the slit tip 21 forming the fixed slit, and passes through the fixed slit, and then each light of the P polarization component 34P and the S polarization component 34S is taken into each core 22*a* of the 2-core ferrule 22 in a state of being separated from each other.

Each light of the P polarization component 34P and the S polarization component 34S taken into each core 22*a* of the 2-core ferrule 22 is received by the two light receiving portions 17 and 18 shown in FIG. 1A, respectively, and is photoelectrically converted to become an electric signal representing each light intensity, which is signal-processed by the signal processing portion 19.

In the distribution type spectroscope 10A of FIG. 5, the return mirror 40 has a movable portion, and the position of the return mirror 40 can be changed by driving the movable portion with an electric motor. When the position of the return mirror 40 changes, the direction in which the diffracted light is directed for each dispersed wavelength changes, so that the wavelength of the light incident on the fixed slit changes. Accordingly, the signal processing portion 19 can acquire the spectrum of the measurement target light 31 by measuring the reception intensity distribution of the light when sweeping the wavelength of the diffracted light received by the light receiving portions 17 and 18 by driving the electric motor.

As described above, for example, when the slit of the slit tip 21 does not exist in the plurality of polarization introduction portions 16 shown in FIGS. 1A and 1B, the spatial resolution is determined by the diameter of the core 22*a* of the 2-core ferrule 22. When the core diameter is reduced to increase the spatial resolution, the diameter in the direction of the engraved line 14a, which is not related to the spatial resolution, is also reduced, so that the light intensity that the light receiving portions 17 and 18 can receive is reduced and the dynamic range and level accuracy are affected. Further, it becomes difficult to perform assembly adjustment including precise alignment between the core 22a and the diffracted light of each polarization component, and further, it is affected by the spatial displacement of the light beam due to the thermal expansion of the component caused by the operating temperature. When the core diameter is increased, the above-mentioned problem can be solved, but the wavelength resolution cannot be increased.

Further, for example, when a slit is provided at a position on the front side slightly away from the 2-core ferrule 22 shown in FIG. 1B, the center of the slit and the center of the core 22a of the 2-core ferrule 22 need to be precisely aligned, and there is a problem that it takes time and effort and the entire device also becomes large.

However, in the case of the optical spectrum analyzers 50 and 50A according to the present embodiment, as shown in FIG. 1B, the slit tip 21 is directly attached to the incident side end surface 22b of the 2-core ferrule 22, so that it is easy to align and assemble. Moreover, since the wavelength resolution depends on the width W of the fixed slit of the slit tip 21, it is not necessary to reduce the diameter of the core 22a of the 2-core ferrule 22, and it is easy to improve the wavelength resolution. In addition, it is easy to increase the light intensity that the light receiving portions 17 and 18 can receive light, and it is possible to prevent a decrease in dynamic range and level accuracy.

Further, in the optical spectrum analyzers 50 and 50A, the measurement target light 31 separated into two orthogonal polarization components is diffracted with the same diffraction efficiency, so that the SNR of the light of each polarization component is measured in substantially the same manner. Further, since the light of each orthogonal polarization component is diffracted with the same diffraction efficiency without depending on the polarization state of the measurement target light 31, there is no need to control the polarization state of the measurement target light 31, which is inputted when the spectrum of each polarization component is measured, with a polarization controller. Further, even in the measurement of the total power spectrum of the measurement target light 31, the optical spectrum analyzers 50 and 50A that do not depend on the polarization of the measurement target light are realized. Further, the optical spectrum measurement of the light that is separated into orthogonal polarization components can be used for optical signal-to-noise ratio (OSNR) measurement using the polarization nulling method and for monitoring polarization interleaved multiplexed signals.

Here, each of the features of the optical spectrum analyzer according to the embodiment of the present disclosure described above are briefly summarized and listed below in [1] to [6].

[1] The optical spectrum analyzers 50 and 50A incorporating the distribution type spectroscopes 10 and 10A having the light incident portion 11 that is inputted the measurement target light 31, the collimator 12 that converts the measurement target light incident on the light incident portion into parallel light, the diffraction grating 14 that is inputted with the parallel light and outputs diffracted light, and the condenser 15 that condenses the diffracted light from the diffraction grating, include the polarization separation portion 13 that separates the parallel light emitted from the collimator into two polarization components and outputs light of each separated polarization component to the diffraction grating, the fixed slit (slit tip 21) that is disposed at a position at which the light condensed by the condenser is inputted, the 2-core ferrule 22 that separates and separately takes in the light of each polarization component that has passed through the fixed slit, the plurality of light receiving portions 17 and 18 that photoelectrically convert the light of each polarization component taken into the 2-core ferrule, and the signal processing portion 19 that processes an electric signal output by each of the plurality of light receiving portions to obtain an optical spectrum, in which the light incident on the polarization separation portion includes the two polarization components whose polarization planes are orthogonal to each other, each polarization plane of the two polarization components is in a state of being shifted by 45 degrees in opposite directions from each other with respect to the engraved line 14a of the diffraction grating, a separation direction of the two polarization components separated by the polarization separation portion is the same direction as an engraved line direction of the diffraction grating, and the fixed slit is fixed to the end portion (incident side end surface 22b of the 2-core ferrule in a state where the diffracted light of each of the two polarization components separated in the engraved line direction of the diffraction grating can pass through.

[2] In the optical spectrum analyzer 50 according to the above [1], the condenser condenses the diffracted light of the two polarization components that have passed through the diffraction grating once and guides the diffracted light to the fixed slit (see FIG. 1A).

[3] The optical spectrum analyzer 50A according to the above [1] includes the return mirror 40 that is disposed at a position at which the diffracted light from the diffraction grating can be incident and returns the incident light in the engraved line direction of the diffraction grating to input the incident light to the diffraction grating again, in which the condenser condenses the diffracted light of the two polarization components that have passed through the diffraction grating twice and guides the diffracted light to the fixed slit (see FIG. 5).

[4] In the optical spectrum analyzer according to any one of the above [1] to [3], the fixed slit is constituted with a thin plate-shaped small piece member (slit tip 21) in which the slit is formed by aligning the longitudinal direction of the slit with an engraved line direction of the diffraction grating, and is attached and fixed to the end surface (incident side end surface 22b) of the 2-core ferrule.

[5] In the optical spectrum analyzer according to any one of the above [1] to [4], a direction of the end surface (incident side end surface 22b) of the 2-core ferrule and the surface of the fixed slit is inclined with respect to an incident axis direction of the incident light (diffracted light 34) (see FIG. 4B).

[6] In the optical spectrum analyzer according to any one of the above [1] to [5], a slit shape (slit-shaped opening 21b) of the fixed slit is disposed in a state in which the longitudinal direction thereof coincides with the alignment direction of the two cores 22a of the 2-core ferrule, the longitudinal direction dimension H of the slit shape is two times or more a diameter of the core, and the width direction dimension W of the slit shape is smaller than the diameter of the core.

DESCRIPTION OF REFERENCE NUMERALS AND SIGNS 10, 10A Distribution Type Spectroscope
11 Light Incident Portion
12 Collimator
13 Polarization Separation Portion
14 Diffraction Grating
14a Engraved Line
15 Condenser
16 Plurality of Polarization Introduction Portions
17, 18 Light receiving portion
19 Signal Processing Portion
21 Slit Tip
21a Base Material
21b Slit-Shaped Opening
21c Second Layer Material
22 2-Core Ferrule
22a Core
22b Incident Side End Surface
25 Light Guide Portion
25a, 25b Optical Connector
25c, 25d Optical Fiber
31 Measurement Target Light
32 Parallel Light
33, 33A, 33B, 33C, 34 Diffracted Light
34P P Polarization Component
34S S Polarization Component
40 Return Mirror
50, 50A Optical spectrum analyzer

What is claimed is:

1. An optical spectrum analyzer having a light incident portion that is inputted measurement target light, a collimator that converts the measurement target light incident on the light incident portion into parallel light, a diffraction grating that diffracts the parallel light, and a condenser that condenses diffracted light from the diffraction grating, the optical spectrum analyzer comprising:
   a polarization separation portion that separates the parallel light emitted from the collimator into light of two polarization components and outputs the light to the diffraction grating;
   a fixed slit that is disposed at a position at which diffracted light of each polarization component is condensed by the condenser;
   a 2-core ferrule that separately takes in the diffracted light of each polarization component that has passed through the fixed slit;
   two light receiving portions that each photoelectrically convert the diffracted light of each polarization component taken into the 2-core ferrule; and
   a signal processing portion that processes an electric signal output by each of the two light receiving portions to obtain an optical spectrum, wherein
   each polarization plane of the two polarization components separated by the polarization separation portion is incident on the diffraction grating in a state of being shifted by 45 degrees in opposite directions from each other with respect to an engraved line of the diffraction grating, and
   the fixed slit is fixed to an end portion of the 2-core ferrule in a state where the diffracted light of each of the two polarization components can pass therethrough.

2. The optical spectrum analyzer according to claim 1, wherein
   the condenser condenses the diffracted light of the two polarization components that have passed through the diffraction grating once and guides the diffracted light to the fixed slit.

3. The optical spectrum analyzer according to claim 1, further comprising:
   a return mirror that is disposed at a position at which the diffracted light from the diffraction grating can be incident and returns incident light in an engraved line direction of the diffraction grating to input the incident light to the diffraction grating again, wherein
   the condenser condenses the diffracted light of the two polarization components that have passed through the diffraction grating twice and guides the diffracted light to the fixed slit.

4. The optical spectrum analyzer according to claim 1, wherein
   the fixed slit is constituted with a thin plate-shaped small piece member in which the slit is formed by aligning a longitudinal direction of the slit with an engraved line direction of the diffraction grating, and is attached and fixed to an end surface of the 2-core ferrule.

5. The optical spectrum analyzer according to claim 1, wherein
   a direction of an end surface of the 2-core ferrule and a surface of the fixed slit is inclined with respect to an incident axis direction of incident light.

6. The optical spectrum analyzer according to claim 1, wherein
   a slit shape of the fixed slit is disposed in a state in which a longitudinal direction thereof coincides with an alignment direction of two cores of the 2-core ferrule, a longitudinal direction dimension of the slit shape is two times or more a diameter of the core, and a width direction dimension of the slit shape is smaller than the diameter of the core.

* * * * *